US006809488B2

(12) United States Patent
Otte

(10) Patent No.: US 6,809,488 B2
(45) Date of Patent: Oct. 26, 2004

(54) METHOD FOR DETERMINING THE POSITION OF AN ELEMENT DRIVEN BY THE DRIVE SHAFT OF A DIRECT CURRENT MOTOR

(75) Inventor: Stefan Otte, Witten (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 52 days.

(21) Appl. No.: 10/309,932

(22) Filed: Dec. 4, 2002

(65) Prior Publication Data
US 2003/0111995 A1 Jun. 19, 2003

Related U.S. Application Data

(63) Continuation of application No. PCT/EP01/06221, filed on Jun. 1, 2001.

(30) Foreign Application Priority Data
Jun. 6, 2000 (DE) .......................................... 100 28 038

(51) Int. Cl.[7] .......................... G05B 5/00; G05D 3/00; H02H 7/08; H02P 1/04; H02P 3/00
(52) U.S. Cl. ...................... 318/468; 318/266; 318/280; 318/282; 318/283; 318/445; 318/466; 318/470; 701/36; 701/49
(58) Field of Search ................................ 318/466–470, 318/280–288, 445, 254, 430; 701/36, 49

(56) References Cited

U.S. PATENT DOCUMENTS

| 4,006,392 | A | * | 2/1977 | Catlett et al. ................ 318/266 |
| 4,335,339 | A | * | 6/1982 | Brickner ...................... 318/282 |
| 4,453,112 | A | * | 6/1984 | Sauer et al. ................. 318/281 |
| 4,924,166 | A | * | 5/1990 | Roussel ....................... 318/608 |
| 5,069,000 | A | * | 12/1991 | Zuckerman .................... 49/28 |
| 5,334,876 | A | * | 8/1994 | Washeleski et al. ........ 307/10.1 |
| 5,432,421 | A | | 7/1995 | Kessler et al. |
| 5,459,379 | A | | 10/1995 | Takeda et al. |
| 5,483,135 | A | * | 1/1996 | Parks .......................... 318/469 |
| 5,530,329 | A | * | 6/1996 | Shigematsu et al. ......... 318/469 |
| 5,543,692 | A | * | 8/1996 | Howie et al. ................ 318/282 |
| 5,683,160 | A | * | 11/1997 | Fukaya et al. ................. 353/57 |
| 5,714,854 | A | * | 2/1998 | Mizuta et al. ............... 318/266 |
| 5,729,104 | A | * | 3/1998 | Kamishima et al. ......... 318/446 |
| 5,777,446 | A | | 7/1998 | Knab et al. |
| 5,801,501 | A | * | 9/1998 | Redelberger ................. 318/283 |
| 6,002,228 | A | * | 12/1999 | Knab .......................... 318/469 |
| 6,043,620 | A | * | 3/2000 | Koestler ...................... 318/282 |
| 6,064,165 | A | * | 5/2000 | Boisvert et al. ............. 318/465 |
| 6,236,176 | B1 | * | 5/2001 | Uebelein et al. ............. 318/287 |
| 6,326,757 | B1 | * | 12/2001 | Aoki et al. .................. 318/599 |
| 6,404,158 | B1 | * | 6/2002 | Boisvert et al. ............. 318/469 |

FOREIGN PATENT DOCUMENTS

DE 42 29 439 A1 9/1992
DE 198 55 996 C1 12/1998

* cited by examiner

Primary Examiner—David Martin
Assistant Examiner—Renata McCloud
(74) Attorney, Agent, or Firm—Brooks Kushman P.C.

(57) ABSTRACT

A method for determining the position of an element drivable by a motor within a travel segment between first and second positions. The method includes energizing a motor to drive the element along the travel segment. Current ripples contained in an armature current signal of the motor are counted as the motor drives the element. The position of the element along the travel segment is determined as a function of the counted current ripples. The motor is de-energized once the position of the element is within a certain distance of the first position if the element is to be driven into the first position. The motor is then re-energized to drive the element into the first position. The counted current ripples is set to a reset value after the element has been driven into the first position such that the reset value corresponds to the first position.

9 Claims, 1 Drawing Sheet

METHOD FOR DETERMINING THE POSITION OF AN ELEMENT DRIVEN BY THE DRIVE SHAFT OF A DIRECT CURRENT MOTOR

CROSS-REFERENCE TO RELATED APPLICATIONS

This is a continuation of International Application PCT/EP01/06221, published in German, with an international filing date of Jun. 1, 2001.

BACKGROUND OF THE INVENTION

1. Field of the Invention

The present invention relates to a method for determining the position of an element driven by the drive shaft of a direct current (DC) motor within a predetermined segment of travel between two block positions by evaluating the current ripple contained in the armature current signal which involves performing a system-side standardization when the driven element moves into a defined block position.

2. Background Art

The armature current signal of a direct current (DC) motor includes a so-called direct component and a ripple component superimposed on the direct component. The ripple component arises when the DC motor is operated as a consequence of the interaction of the magnetic field, the armature winding, and the commutator of the DC motor. This expresses itself in a short-term change in the induced voltage, which produces the ripple content of the armature current signal. The current peaks contained in the armature current signal that arise in the described maimer (referred to below as "current ripple") occur when the armature turns and have a frequency corresponding to the number of collector bars.

For example, if the armature has ten collector bars, the armature current signal accordingly has ten current ripples that can be identified in it. Thus, counting the current ripple can give information about the current rotational position of the armature of the DC motor and thus regarding the mobile element within its predetermined segment of travel. To accomplish this, the analog armature current signal is digitized to be able to perform a corresponding counting.

Since it is known ahead of time how many current ripples the DC motor must turn through until the segment between the two block positions bordering the segment of travel is covered, the position of the driven element can be determined by counting the current ripples. Such processes are used, for example, in the area of motor vehicles to control adjustment drives such as those that are provided for power windows and/or sunroofs. An essential element in capturing the position of the window glass, for example, is the position at which the pinching protection can be turned off when the window is closed. The pinching protection has to be turned off so that the window glass can go completely in its top block and into the weather strip provided there without the DC motor being turned off as a result of the increased load. If the counting of the current ripples to determine the position of the window glass is incorrect it can happen that the pinching protection is turned off too early or too late.

To increase accuracy of determining the position of the moving element, for example a motor vehicle window glass, there is a system-side standardization or restandardization when the window has gone into its top block position, since now the ACTUAL position of the window glass and the mechanically defined block position actually coincide. This restandardization resets the current ripple counter to zero, which prevents the accumulation of errors over a longer period of time. Even if such restandardization measures make it possible in principle to determine the precise position of the driven element over a longer period of time, such restandardization is nevertheless inadequate if, after the driven element enters the block position, the block position provided for restandardization does not actually coincide with the mechanically defined block position.

For example, this is the case if, when the driven element enters the block position, it rebounds off the block serving as a stop. The driven element is then located in a position (ACTUAL position) which is different from the mechanically defined block position (SETPOINT position). If the system is now post-standardized relative to this position of the driven element, with the assumption that the driven element is located in its mechanically defined block position, then the post-standardization is erroneous and, accordingly, so are the results of subsequent counts. Capture of the position of the driven element is then imprecise, and in particular individual positions within the driven element's segment of travel cannot be reproducibly approached with the necessary accuracy, since the standardization is always based on different assumptions which are the result of chance, perhaps the rebound of the driven element. The consequence of such behavior of the driven element is that such a process of this type can only be used if the mechanical inaccuracies which result from entering the block position are negligibly small.

SUMMARY OF THE INVENTION

Therefore, starting from the prior art which has been discussed, an object of the present invention is to provide a method for determining the position of an element driven by the drive shaft of a direct current (DC) motor between two block positions by evaluating the current ripple contained in the armature current signal with the method being developed in such a way that the prior art's block position post-standardization errors are negligible, even with applications in which the driven element moves with high kinetic energy.

This task is solved according to the invention by the fact that when the position of the driven element is within a certain distance of the system-side mechanically defined block position the direct current (DC) motor is de-energized for a predetermined period of time. The DC motor is then actively re-energized for the final entry of the driven element into the mechanically defined block position. A system-side standardization is performed after the driven element has been put into the mechanically defined block position.

When the method in accordance with the present invention is used, the driven element enters a block position with a relatively lesser amount of kinetic energy. This is a result of the DC motor being de-energized prior to the position of the driven element reaching the system-side mechanically defined block position in order to reduce the kinetic energy of the driven element. Here the term "de-energized" is understood to mean that the DC motor is not actively fed any operating voltage. This can be done, for example, by turning the DC motor off or also by switching the DC motor over or short-circuiting the DC motor into generator operation.

After a predetermined time interval, which can be allowed to vary as a function of other factors, the DC motor is re-energized so that the driven element, which now has substantially less kinetic energy than it had prior to the DC motor being de-energized, enters the mechanically defined block position. It is only once the driven element is in its mechanically defined block position that the specified system-side standardization or post-standardization is performed. Thus, the post-standardization is done at a point in time which ensures that the driven element is actually located, with sufficient accuracy, in its mechanically defined block position.

De-energizing the DC motor a short distance before the actual block position is reached and re-energizing it means that the driven element enters the block position with relatively much less kinetic energy. This substantially reduces the danger of rebound of the driven element or also of spring-back of the power transmission mechanics that are used between the DC motor and the driven element. Therefore, the method in accordance with the present invention is also especially suitable for performing post-standardization in a block position with such adjustment devices in which the driven elements move with relatively high kinetic energy, which can be caused either by a correspondingly powerful DC motor and/or by the fact that the mass moved by the DC motor is large.

It is expedient to re-energize the DC motor for the final entry of the driven element into the mechanical block position after it has been recognized that the DC motor's armature has completely slowed down as a consequence of being de-energized. This ensures that, at the point in time when the DC motor begins to be re-energized for the final entry of the driven object into the block position, the driven element holds no kinetic energy, since it has stopped. It is preferable to recognize the state in which the DC motor's armature is no longer turning by the fact that the de-energized DC motor switches over to generator operation. The current signal now generated by the DC motor is a measure of the armature's rotational speed. If the armature is no longer rotating and thus has stopped, like the driven element, the current signal is equal to zero.

A system-side standardization in this block position can be done on the basis of the detected movements which the driven element makes before its desired entry into the block position. For example, standardization can involve calibrating the current position counter relative to this block position, or post-standardizing the position counter relative to the previously calibrated position. This can depend on whether the driven element has entered this block position more or less directly after it entered the other block position in which a standardization was also performed, or whether before entering this block position the driven element made numerous movements without reaching a block position.

The method in accordance with the present invention is especially suitable for recognizing the position of an adjustment device for opening and closing a window, a sunroof, or for adjusting a seat in a motor vehicle. Up to now it has only been possible to perform standardization or post-standardization in the top block position, since the entry of the window into this block position could be more or less defined by the weather strip arrangement which compensated for the kinetic energy of the window, which made it possible to assume with sufficient accuracy that for standardization the window in its ACTUAL position was actually located in the mechanically defined block position (SETPOINT position).

With the method of the present invention, a system-side post-standardization can now be done in the lower block position. This increases the operating convenience of the adjustment device. To avoid a large cumulative error when the window is operated several times without entering the top block position, the prior art provides a system destandardization. Such system destandardization blocks automatic raising of the window, so that the window can be closed only by manual switch operation. The capability of now being able to perform standardization in the lower block position as well as being able to perform standardization in the top block position means that a system-side destandardization only needs to be introduced in exceptional cases. The statistical probability of the window entering one or the two block positions for post-standardization of the system when it is operated numerous times is substantially increased.

DETAILED DESCRIPTION OF THE PREFERRED EMBODIMENT(S)

Figure 1:
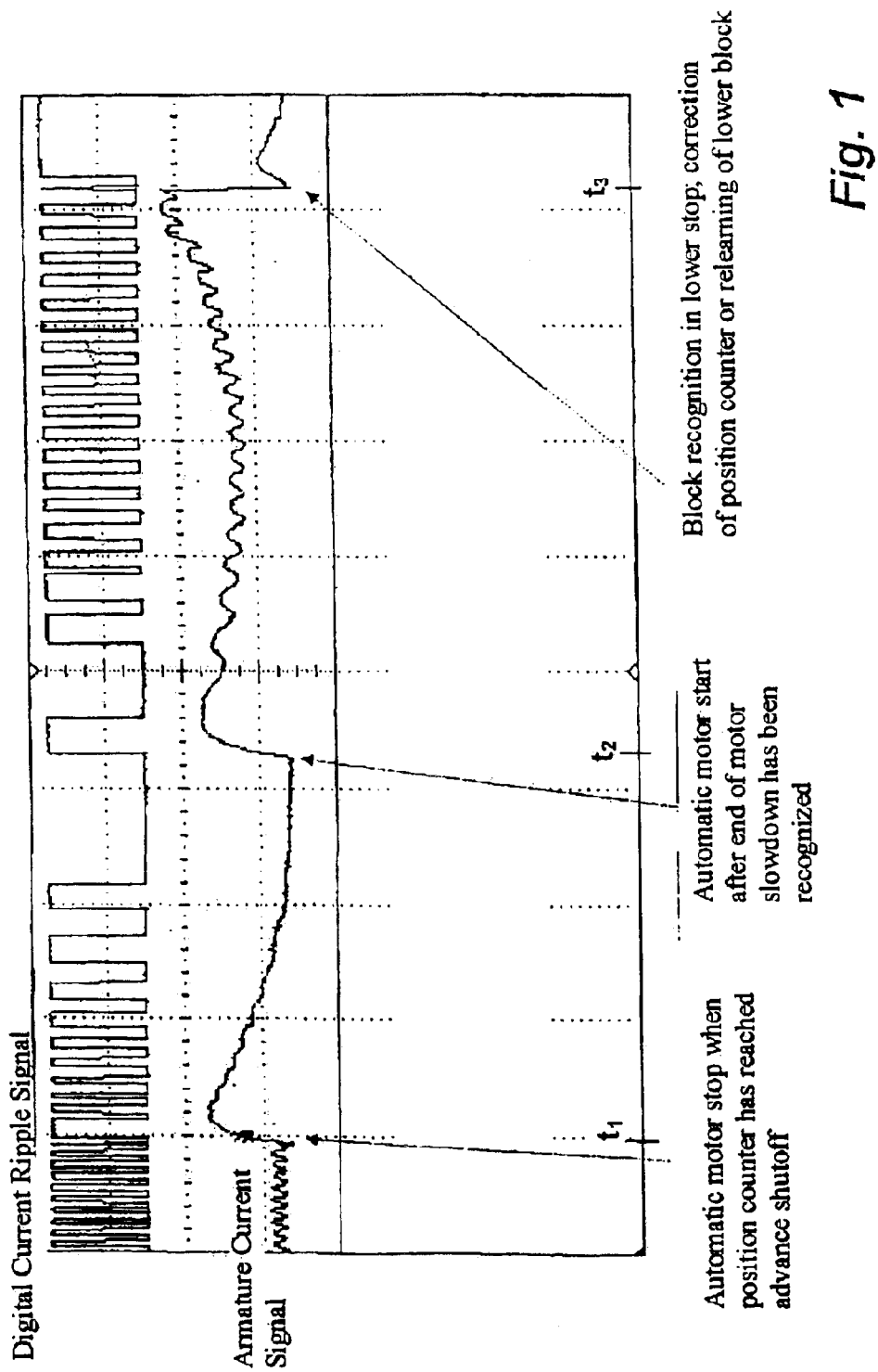
FIG. 1 illustrates a diagram of the analog armature current signal of the direct current (DC) motor which shows the different states of the DC motor and the progression of the operational steps of the method in accordance with the present invention.

With reference to FIG. 1, for a motor vehicle window to enter a lower block position the following happens in accordance with the method of the present invention. At a point in time $t_1$ when the counter recognizes that the window is located within a certain distance of the previously defined lower block position, the direct current (DC) motor is de-energized and switched over to generator operation. The operation of the DC motor before time $t_1$ is defined by its predetermined rotational speed, which is reproduced in the current peaks of the armature current signal and also in the current ripple signal that is illustrated above the armature current signal. During the DC motor's generator operation following time point $t_1$, first a high current signal and then one that decreases more and more can be picked up at the DC motor.

At time point $t_2$, the slowdown of the DC motor's armature has been detected and the DC motor is re-energized for the final entry of the window into the defined lower mechanical block position. The DC motor is preferably re-energized with relatively less energy than the amount of energy used to energize the DC motor prior to it being de-energized. The frequency of the current ripple that can be seen on the armature current curve makes it clear that, in this phase, the rotational speed of the armature is very much smaller than that with which the DC motor moved the window before time $t_1$. The window's location in the lower block position can be detected at time point $t_3$ as the armature stops so that the desired system-side standardization is now performed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for determining the position of an element drivable by a motor within a predetermined segment of travel between first and second block positions, the method comprising:

energizing the motor to drive the element along the predetermined segment of travel, the element having a given amount of kinetic energy as the motor drives the element alone the predetermined segment of travel;

counting current ripples contained in an armature current signal of an armature of the motor as the motor drives the element alone the predetermined segment of travel;

determining the position of the element along the predetermined segment of travel as a function of the counted current ripples;

if the motor is to drive the element into the first block position once the element is within a certain distance of the first block position, de-energizing the motor for a predetermined period of time in order to reduce the given amount of kinetic energy of the element to a reduced amount of kinetic energy;

re-energizing the motor after the motor has been de-energized for the predetermined period of time in order to drive the element into the first block position such that while being driven by the motor into the first block position the element has more than the reduced amount of kinetic energy but less than the given amount of kinetic energy; and setting the counted current ripples to a reset value after the element has been driven by the motor into the first block position and prior to the element being driven by the motor out of the first block position such that the reset value corresponds to the first block position.

2. The method of claim 1 wherein:

the step of re-energizing the motor occurs after the armature of the motor slows to a certain speed as a result of the motor being de-energized.

3. The method of claim 2 wherein:

the step of de-energizing the motor includes switching the motor to generator operation.

4. The method of claim 1 wherein:

the predetermined segment of travel is inclined and the first block position is lower block position and the second block position is an upper block position.

5. The method of claim 1 wherein:

the element is a window.

6. The method of claim 1 wherein:

the element is a sunroof.

7. The method of claim 1 wherein:

the element is a seat.

8. The method of claim 1 wherein:

de-energizing the motor includes de-energizing the motor in order to stop the element along the predetermined segment of travel such that the reduced amount of kinetic energy of the element is substantially zero kinetic energy.

9. The method of claim 1 further comprising:

energizing the motor to drive the element out from the first block position towards the second block position along the predetermined segment of travel, the element having the given amount of kinetic energy as the motor drives the element along the predetermined segment of travel towards the second block position;

counting current ripples contained in the armature current signal of the armature of the motor as the motor drives the element along the predetermined segment of travel towards the second block position;

determining the position of the element along the predetermined segment of travel as a function of the counted current ripples;

if the motor is to drive the element into the second block position once the element is within a certain distance of the second block position, de-energizing the motor for the predetermined period of time in order to reduce the given amount of kinetic energy of the element to the reduced amount of kinetic energy;

re-energizing the motor after the motor has been de-energized for the predetermined period of time in order to drive the element into the second block position such that while being driven by the motor into the second block position the element has more than the reduced amount of kinetic energy but less than the given amount of kinetic energy; and setting the counted current ripples to a reset value after the element has been driven by the motor into the second block position and prior to the element being driven by the motor out of the second block position such that the reset value corresponds to the second block position.

* * * * *

UNITED STATES PATENT AND TRADEMARK OFFICE
CERTIFICATE OF CORRECTION

PATENT NO. : 6,809,488 B2
DATED : October 26, 2004
INVENTOR(S) : Stefan Otte

It is certified that error appears in the above-identified patent and that said Letters Patent is hereby corrected as shown below:

Column 5,
Line 3, delete "alone" and insert -- along --.
Line 34, after "is" insert -- a --.

Signed and Sealed this

Seventeenth Day of May, 2005

JON W. DUDAS
*Director of the United States Patent and Trademark Office*